J. T. COOPER & J. WAGNER.
Tap for Tin-Cans, &c.

No. 221,285. Patented Nov. 4, 1879.

WITNESSES:
Chas. Nida
C. Sedgwick

INVENTOR:
J. T. Cooper
J. Wagner
BY Munn & Co.
ATTORNEYS.

UNITED STATES PATENT OFFICE.

JOHN T. COOPER AND JULIUS WAGNER, OF SILVER REEF, UTAH TERRITORY.

IMPROVEMENT IN TAPS FOR TIN CANS, &c.

Specification forming part of Letters Patent No. 221,285, dated November 4, 1879; application filed June 12, 1879.

*To all whom it may concern:*

Be it known that we, JOHN TILLY COOPER and JULIUS WAGNER, of Silver Reef, in the county of Washington and Territory of Utah, have invented a new and useful Improvement in Taps for Tin Cans and other vessels, of which the following is a specification.

Figure 1:
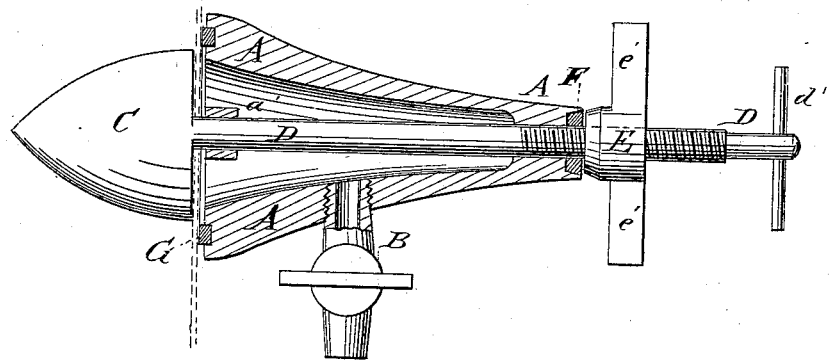
Figure 2:
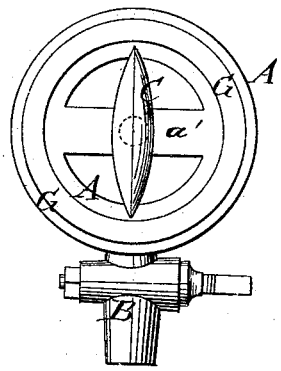
Figure 3:
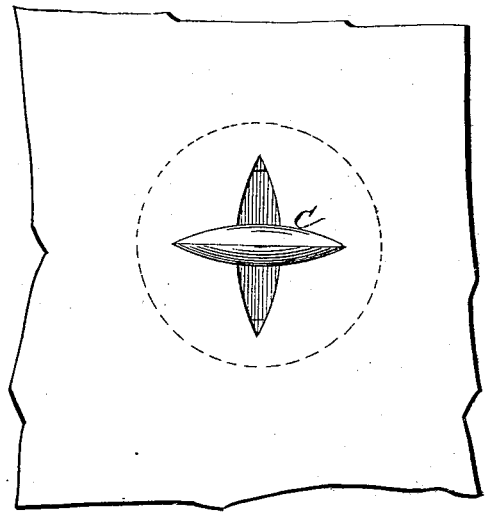

Figure 1 is a side view of the device, partly in longitudinal section, to show the construction. Fig. 2 is a face view of the same. Fig. 3 is a detail view of the arrow-head after being forced through the side of the vessel.

Similar letters of reference indicate corresponding parts.

The object of this invention is to furnish an improved device for tapping cans and other vessels made of tin or other light sheet metal, so that the contents of the said cans or vessels can be drawn off, as may be required, without waste, and without its being necessary to empty the said can into a receiving-vessel, and which shall be simple in construction and convenient and reliable in use.

The invention consists in the combination of the conical or bell-shaped body, provided with the cross-bar and the faucet, the arrow-head, the stem, provided with the screw-thread upon its outer part, and a cross-pin in its outer end, the nut having its inner part rounded and tapering, and provided with the arms, and the two packings, with each other, as hereinafter fully described.

A represents the body of the tap, which is made conical or bell-shaped and with a cross-bar, $a'$, across its mouth.

To one side of the body A, and at right angles with the cross-bar $a'$, is secured a faucet, B, opening into the cavity of the said body A.

C is a steel knife, made in the shape of an arrow-head, and provided with a stem, D, which passes through a hole in the center of the cross-bar $a'$, and through a hole in the outer end of the body A. In a cross-hole in the outer end of the stem D is inserted a cross-pin, $d'$, for convenience in turning it, and which should be placed parallel with the arrow-head C, so as to indicate the position of the said arrow-head when inside the can.

Upon the stem D, from a point a little within the outer end of the body A nearly to the outer end of the said stem, is formed a screw-thread to receive the nut E, which is provided with two arms, $e'$, upon its outer part for convenience in turning it.

The forward part of the nut E is rounded off and tapered to enter the countersunk outer end of the hole in the end of the body A, and compress the packing F into the said countersink, and prevent the escape of liquid around the stem D.

The packing F is made of rubber or other yielding material, and is made a little larger than the inner part of the countersink in which it is placed, so that the nut E may press it closely around the stem D.

In the inner edge of the body A is formed a ring-groove or rabbet to receive the packing-ring G, which is made of rubber or other yielding material and thicker than the depth of the groove or rabbet in which it is placed, so as to prevent the escape of liquid between the said body A and the side of the vessel to which it is applied.

The inner or larger end of the body A is made flat or concaved to fit against the side of the can or other vessel, and the shoulders or base of the arrow-head C is shaped accordingly.

In using the tap the nut E is turned off nearly to the pin $d'$, the stem D is turned to bring the arrow-head C at right angles with the cross-bar $a'$, the point of the arrow-head C is placed against the side of the can with its wings in line with the length of the can, and the said arrow-head is driven through the side of the said can by striking upon the outer end of the stem D with a hammer or mallet. The stem D is then turned to bring the arrow-head C across the cut, as shown in Fig. 3, and parallel with the bar $a'$, and the nut E is turned down to clamp the side of the can between the arrow-head C and the wide inner end of the body A, and compress the two packings, F G, so that there can be no leaking of the liquid. The can is then placed upon some suitable support, and the liquid is drawn off through the faucet B, as it may be required.

Having thus described our invention, we claim as new and desire to secure by Letters Patent—

The combination of the conical or bell-shaped body A, provided with the cross-bar a' and the faucet B, the arrow-head C, the stem D, provided with screw-thread upon its outer part, and a cross-pin, d', in its outer end, the nut E having its inner part rounded and tapered, and provided with the arms e', and the packings F G with each other, substantially as herein shown and described.

JOHN TILLY COOPER.
JULIUS WAGNER.

Witnesses:
JAMES LIDDLE,
J. A. SCHMIDT.